United States Patent [19]
Gates et al.

[11] Patent Number: 4,460,126
[45] Date of Patent: Jul. 17, 1984

[54] AIR PURGE/SOLVENT BATH APPARATUS AND METHOD

[75] Inventors: William J. Gates, Glen Ellyn, Ill.; John F. Zwirlein, New Haven, Conn.

[73] Assignee: Olin Corporation, New Haven, Conn.

[21] Appl. No.: 354,427

[22] Filed: Mar. 3, 1982

[51] Int. Cl.³ .............................................. B05B 15/02
[52] U.S. Cl. ................................................. 239/112
[58] Field of Search .............. 239/104, 106, 112, 113; 134/44, 57 R, 104, 172, 198

[56] References Cited

U.S. PATENT DOCUMENTS

| | | | |
|---|---|---|---|
| 3,179,341 | 4/1965 | Plos et al. | 239/414 |
| 3,690,556 | 9/1972 | McCain | 239/112 |
| 3,752,398 | 8/1973 | Svensson | 239/1 |
| 3,799,403 | 3/1974 | Probst et al. | 222/135 |
| 3,873,023 | 3/1975 | Moss et al. | 239/3 |
| 3,876,114 | 4/1975 | Hicks et al. | 222/148 |
| 3,945,569 | 3/1976 | Sperry | 239/112 |
| 4,073,664 | 2/1978 | Zwirlein | 239/112 |
| 4,159,806 | 7/1979 | Scharfenberger | 239/708 |
| 4,262,847 | 8/1981 | Stitzer et al. | 239/112 |

Primary Examiner—Andres Kashnikow
Assistant Examiner—Jon M. Rastello
Attorney, Agent, or Firm—Ralph D'Alessandro; Donald F. Clements; Thomas P. O'Day

[57] ABSTRACT

A method of operating and the apparatus for dispensing plural component polyurethane foam is disclosed wherein the working parts are cleaned by a combination of air purging and immersion in a static solvent bath.

8 Claims, 4 Drawing Figures

AIR PURGE/SOLVENT BATH APPARATUS AND METHOD

BACKGROUND OF THE INVENTION

The present invention relates generally to the method for operating and the apparatus for dispensing a plurality of liquids through a single orifice, and more particularly, to the method and apparatus for dispensing and cleaning the chemical reactants required to form polyurethane foams from the dispensing assembly.

Polyurethane foams are formed by the reaction of an isocyanate component A and hydroxyl-bearing compounds. When mixed in the presence of a catalyst and other additives, such as a polyether resin, a surfactant, a catalyst, and a blowing agent, these chemicals react to form cross-linked polymer chains, more commonly known as a polyurethane. Each of these components of the plural component material, by itself, is generally stable. Thus, each component will not cure or cross-link for extended periods of time, often as long as several months, if they are properly stored. However, when the isocyanate component A and the chemical polyol component B, a preformulated compound formed from the aforementioned resin, surfactant, catalyst and blowing agent, are mixed together in proper concentrations, an exothermic chemical reaction of the isocyanate and polyol occurs causing a continued expansion that is evidence of the polymerization and manifests itself as foam which cross-links and cures. The cross-linking and curing usually is substantially completed in a matter of seconds.

Polyurethane foam dispensers are well known and have achieved a high degree of usage in factories where components must be adhesively lined with an insulating foam or where products must be packaged and protected from damage during shipment. This high level of use of polyurethane foam dispensing equipment has also focused attention on the efficiency of prior apparatus employed to accomplish this dispensing. Many of the problems arise from the fact that the polyurethane foam "sets" or builds up in the dispenser, normally within the mixing chamber or the nozzle, after the chemical components have cross-linked and begun to cure. This "setting" can eventually cause the apparatus to become inoperative due to plugging. In operations such as those required during packaging where intermittent use of the dispensing apparatus is required, the "setting" problem is more severe. This typically occurs in the situation where a packer initially directs a "shot" of the mixed plural components into the bottom of a container, inserts a polyethylene strip over the top, and places the product to be shipped in the container. Another sheet of polyethylene is placed on top of the product, and the foam dispensing apparatus is then activated after a delay of 10 to 20 seconds from the time the first "shot" was dispensed to fill the box with the cushioning foam. This procedure is repeated for each item to be packed.

Prior foam dispensing apparatus has attempted to solve this "setting" problem by using either separately or in combination air blasts, or cleaning rods or plungers, or solvent to remove the residue foam from the dispensing assembly by scraping. Specific polyurethane foam systems have attempted to use air with pressurized solvent blown into the mixing chamber and the dispensing nozzle, an automatic solvent flush that runs through the mixing chamber and dispensing nozzle, a blast of purging gas preceding the continuous pumping of solvent through the mixing chamber and dispensing nozzle, and reciprocating cleaning rods or plungers which may or may not use the solvent to facilitate the scraping of residue foam from the dispensing apparatus.

All of the systems have suffered from the disadvantage of employing moving parts which cause additional wear and tear, such as the cleaning rods, or have required active solvent flush systems whereby the solvent was either continuously recycled through the mixing chamber and dispensing nozzle or periodically blown into the mixing chamber and dispensing nozzle under pressure. The use of a continuous stream of solvent or the intermittent delivery of solvent under pressure required additional pumps and solvent reservoirs within the apparatus that are costly and conducive to untimely breakdowns and repairs. Additionally, the prior foam dispensing apparatus has generally required the actual dispensing assembly to be broken down frequently to permit at least the mixing chamber and the discharge nozzle to be cleaned of the set foam residue.

These problems are solved in the design of the present invention by providing a method and apparatus for dispensing plural component polyurethane foam from a dispensing assembly by employing a combination of air purge and immersion of a portion of the assembly in a static solvent bath.

SUMMARY OF THE INVENTION

It is an object of the present invention to provide a method and apparatus for cleaning the working parts of a plural component dispensing assembly by a combination of an air purge and immersion in static solvent bath system.

It is another object of the present invention to provide a simple, low cost method and apparatus of cleaning the working parts of a plural component dispensing assembly.

It is a feature of the present invention that the plural component dispensing assembly is at least partially immersed in a solvent bath after a blast of purging air has been directed through the assembly.

It is another feature of the present invention that residual air in the dispensing assembly is vented prior to the assembly's being immersed in the solvent bath to permit the liquid solvent to displace the air and solvent to flow into the dispensing assembly.

It is a further feature of the present invention that the solvent is contained in a dispensing assembly retainer which includes an air switch that is tripped as the assembly is inserted thereinto to automatically vent the residual air and stop the flow of mix air and purging air into the dispensing assembly.

It is an advantage of the present invention that the use of movable parts within the dispensing assembly to accomplish the cleaning and which are subject to wear is substantially avoided.

It is another advantage of the present invention that purge air is utilized to assist in the cleaning.

It is a further advantage of the present invention that the solvent bath requires no pumps, motors, or other delivery systems to deliver the solvent to the dispensing assembly.

It is another advantage of the present invention that the solvent bath is contained in a container that it utilized to retain the dispensing assembly during non-use and after dispensing of each shot of polyurethane foam.

It is a further advantage of the present invention that the dispensing assembly can be utilized for one month or longer without having to be broken down and cleaned periodically.

These and other objects, features, and advantages are obtained in the method and apparatus for dispensing and cleaning residue from a plural component dispensing assembly that utilizes mixing gas of predetermined pressure to mix the plural components prior to dispensing by employing a blast of purging gas in combination with the subsequent immersion of at least a portion of the assembly in a static solvent bath.

BRIEF DESCRIPTION OF THE DRAWINGS

The advantages of this invention will become apparent upon consideration of the following detailed disclosure of the invention, especially when it is taken in conjunction with the accompanying drawings wherein.

DETAILED DESCRIPTION OF THE PREFERRED EMBODIMENT

Figure 1:
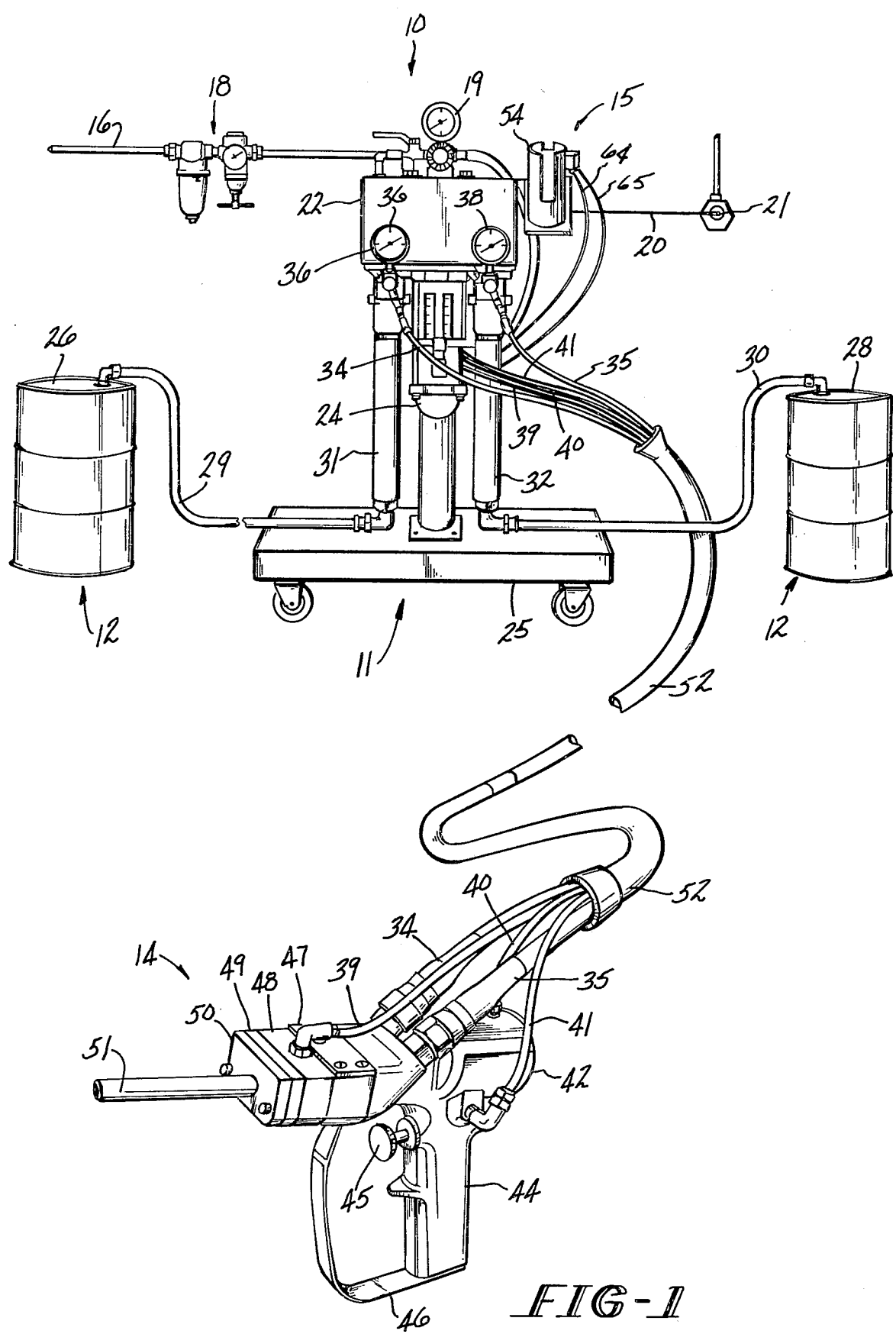
FIG. 1 is an enlarged front perspective view of the dispensing apparatus.

Referring to FIG. 1, there is shown the dispensing apparatus indicated generally by the numeral 10. Apparatus 10 comprises a proportioning unit assembly, indicated generally by the numeral 11, a chemical supply assembly, indicated generally by the numeral 12, a dispensing or gun assembly, indicated generally by the numeral 14, and a solvent bath assembly, indicated generally by the numeral 15.

The proportioning unit 11 has a compressed air supply line 16 that passes through an air regulator filter assembly, indicated generally by the numeral 18 enroute to an air pressure regulator 19. An electrical power supply cord 20 is seen running from an electrical outlet box power source 21 to the electrical control box 22. The electrical power source is typically 110 volt AC. An air motor 24 is mounted to the mobile stand 25 of the proportioning unit 11. Stand 25 is mobile to facilitate moving the proportioning unit 11 and the dispensing or gun assembly 14 to a plurality of work positions about a plant or assembly area. Electrical control box 22 energizes various time delay relays and pressure switches for the automatic control of the purge system after each shot of polyurethane foam is dispensed.

The chemical supply assembly 12 includes an isocyanate component A container 26 and a polyol component B container 28 connected by suction hoses 29 and 30, respectively, to fluid pumps 31 and 32 mounted on the stand 25. The isocyanate component A and the polyol component B chemicals pass through the suction hoses 29 and 30 to the fluid pumps 31 and 32 where fluid pressure is increased in the chemical hoses 34 and 35 as the chemicals are conveyed to the dispensing or gun assembly 14. Suction hoses 29 and 30 may have dip tubes (not shown) connected thereto and inserted within the containers 26 and 28, as appropriate, to extend the suction generated by the pumps 31 and 32 below the level of the chemicals in containers 26 and 28. Fluid pumps 31 and 32 are double-acting to pump the chemicals on both strokes, but draw from the supply within the containers 26 and 28 only on the up-stroke. As a result, the individual chemicals are dispensed at a higher pressure through the chemical hoses 34 and 35. Pressure in the chemical hoses 34 and 35 is measured by the pressure gauges 36 and 38.

Air lines 39, 40, and 41 lead from the air motor 24 to the dispensing or gun assembly 14. Appropriate couplings connect lines 39, 40, and 41 to the gun assembly 14. The compressed air supply line 16 delivers the supply of air which is controlled by the regulator 19 and operates the air motor 24 that drives the fluid pumps 31 and 32. Regulator 19 also supplies air to the gun assembly 14 via the actuator air supply line 41 and provides the air for the air bleed and purge line 39. The air purge system is controlled by a pneumatic pulse transmitted through the air signal line 40 to the electrical control box 22 as a result of the air cylinder (not shown) in the housing 42 of gun assembly 14 moving to a predetermined position. This position is indicative of the shot of polyurethane foam having been completed and serves to trip the delay relay within the electrical control box 22 and automatically initiates the blast of purge air.

Attached to the housing 42 of gun assembly 14 is a handle assembly 44 with a trigger 45 and a trigger guard 46. Gun assembly 14 has an orifice plate adapter 48, an orifice plate 49, a discharge plate 50, and a discharge nozzle 51, appropriately fastened to the housing 42. The gun assembly 14 is generally made of aluminum casting while the orifice plate 49 may be made of stainless steel and the discharge nozzle 51 is made of polyethylene, nylon or other appropriate materials. Gun assembly 14 also includes a gun ball valve body and a gear cover assembly 47 adjacent the orifice plate adapter 48. The air and chemicals flow forward through the orifice plate adaptor 48 and come together at the orifice plate 49, mix in the discharge plate 50, and emerge as foam from the nozzle 51.

The air bleed and purge line 39, the air signal line 40, and the actuator air supply line 41 are joined with the chemical hoses 34 and 35 in an expandable sleeve 52 that jackets the individual lines for protection. The hoses typically are 26 feet in length; divided into a 20 foot section and a 6 foot section with quick disconnects between the two sections to facilitate changing gun assemblies 14. The inlet air pressure is maintained at 80 pounds per square inch to the air motor 24. Air motor 24 is a four inch bore reciprocating motor that develops approximately 1000 pounds of force. When this force is applied to the fluid pumps 31 and 32 through the appropriate connecting mechanism, approximately 270–280 pounds per square inch pressure is maintained to create the required chemical pressure to push the chemical components A and B through the gun assembly 14. Air pressure regulator 19 controls the air motor 24 during operation.

Figure 2:
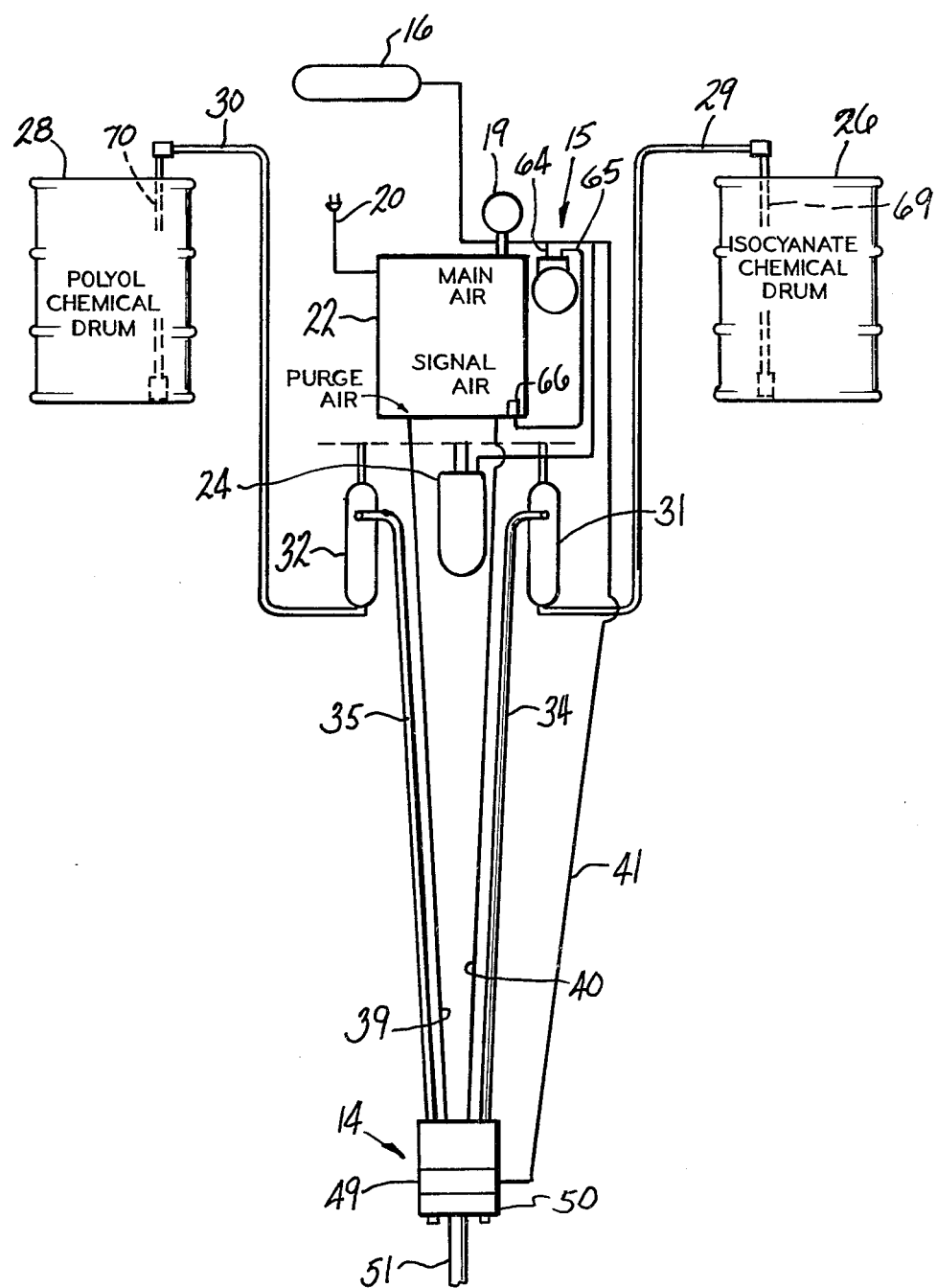
FIG. 2 is a diagramatic illustration of the dispensing apparatus showing the flow of compressed air and chemical components.
Figure 4:
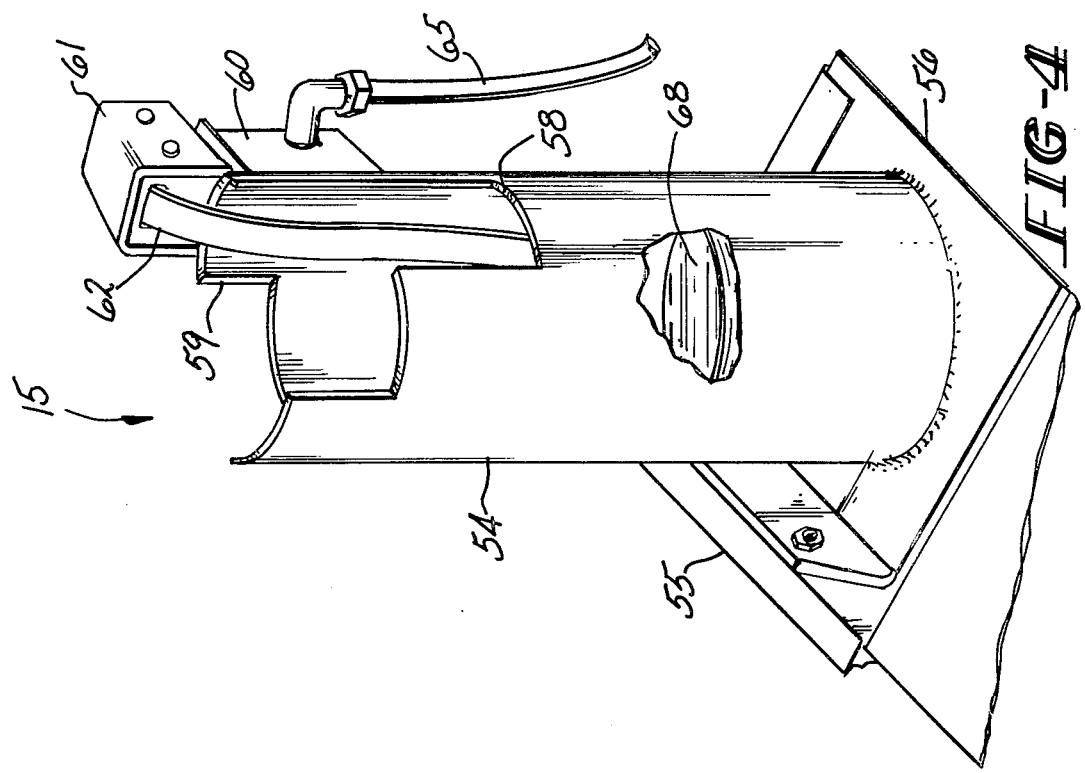
FIG. 4 is a front perspective view of the dispensing assembly retainer with the limit switch attached thereto.
Figure 3:
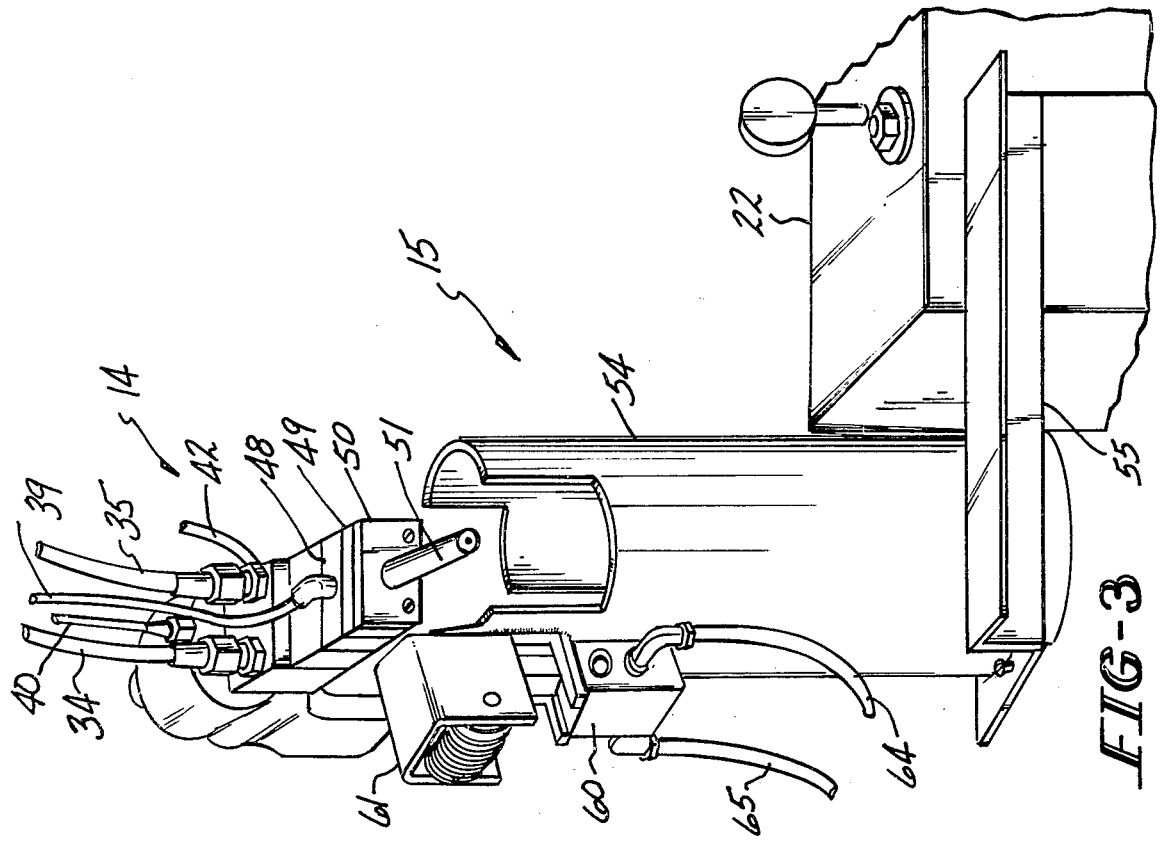
FIG. 3 is a partial perspective view showing the dispensing assembly and the dispensing assembly retainer which serves both as the solvent bath and a holster or retainer of the dispensing assembly.

FIGS. 3 and 4 show the solvent bath assembly 15 in greater detail. As best seen in FIG. 3, the dispensing assembly retainer 54 is appropriately mounted, such as by bracket 55, to the electrical control box 22. Retainer 54 is open-topped, generally cylindrically shaped and sealed at its bottom by base plate 56 which is appropriately fastened to bracket 55, as seen in FIG. 4. Retainer 54 may also be mounted via bracket 55 to a bench or wall, or any other suitable mount, as desired, to optimize operator convenience. The continuous surface of retainer 54 is cut away at predetermined locations to form a suitable mount or holster for gun assembly 14 when gun assembly 14 is inserted thereinto. Retainer 54 has a deeper cut away portion 58 on the side into which the trigger 45 and trigger guard 46 are placed. A smaller cut away portion 59 is positioned on the opposing side of the surface of retainer 54 to permit the chemical hoses 34 and 35 and the air bleed and purge line 39 to rest unobstructed in the retainer 54. Appropriately affixed to the side of retainer 54, such as by welding, is an air switch 60. Mounted atop the air switch 60 is a suitable arm housing 61 with an arm 62 that extends downwardly inside retainer 54. Arm 62 is connected to an appropriate valve within the air switch 60 to control the flow of air through switch 60 by moving between an opened and a closed position. The arm 62 is designed so that it is normally extended outwardly toward the center of the interior portion of container 54 and the air switch 60 is closed. Thus, when the gun assembly 14 is inserted into the retainer, it is engaged by the orifice plate adaptor 48, the orifice plate 49, the discharge plate 50, and the discharge nozzle 51, causing it to pivot downwardly toward the side of retainer 54. This opens the valve in the air switch to permit the air from the air infeed line 64 to pass through the air switch 60 and out through the air pilot sensor line 65 to a three-way pneumatic solenoid valve 66 that is preferably located within the electronic control box 22 (see FIG. 2).

The three-way pneumatic solenoid valve within control box 22 terminates the flow of air through the air bleed and purge line that is used to provide the mix and the purging air to gun assembly 14 during operation by repositioning its valving mechanism in response to the flow of air through the air pilot sensor line 65. In this manner, the mix air and purging air flowing through the gun assembly 14 is shut off prior to the gun assembly 14 being submerged in the solvent bath so that solvent is not splattered out of the bath by the force of the air rushing through the nozzle 51. Concurrently, the three-way solenoid valve 66 vents any residual air within the gun assembly 14 downstream of the valve, thereby allowing the solvent to travel up the discharge nozzle 51 through the discharge plate 50 to the orifice plate 49. This is possible because the residual air that is ventilated to the atmosphere is displaced by the solvent rising up into the gun assembly 14. Without this venting of the residual air, the air pressure within the gun assembly 14 will prevent the solvent from flowing up into the discharge nozzle 51, the discharge plate 50, and the orifice plate 49.

As seen in FIG. 4, an appropriate solvent level 68 is maintained within the retainer 54 to permit at least the discharge nozzle 51, the discharge plate 50, and the orifice plate 49 to be immersed thereinto when the gun assembly 14 is placed in the retainer 54. The pneumatically operated air switch 60 is commercially available as an "Air Switch Operator" from Humphrey Products of Kalamazoo, Mich. The three-way pneumatic solenoid valve 66 is commercially available as an "Asco Solenoid Valve" from the Automatic Switch Company of Florham Park, N.J.

Purging air is automatically sent through the gun assembly 14 after each shot of polyurethane foam is dispensed. A solenoid valve (not shown) electrically controls the purging air and is actuated by time-delayed relays within the electrical control box 22. These relays are activated whenever the trigger is released. A two second delay elapses before the solenoid valve (not shown) is actuated for the approximate two second plast of purge air. If the trigger is squeezed during the purge cycle, the control relay will be deactivated and will not be actuated again until the trigger is released. The amount of pressure necessary to achieve purging with the purging air is optimumly 80 pounds per square inch. An operational pressure range would be 60–85 pounds per square inch while a more preferred pressure range would be 75–85 pounds per square inch.

FIG. 2 is a diagramatic illustration of the dispensing apparatus showing the schematic flow of compressed air and chemical components through the system. The flow of materials is as previously described. Dip tubes 69 and 70 are shown attached to the suction hoses 29 and 30, respectively, within the corresponding isocyanate container 26 and the polyol component B container 28. It should be noted that the containers 26 and 28 can be replaced by pressurized cylinders of either 500 or 1000 gallon capacity. These cylinders are pressurized with nitrogen which thereby do away with the need for an air motor 24 and the fluid pumps 31 and 32, should such a system be desired.

The solvent employed in the solvent bath may either be a diethylene glycol monomethyl ether, commercially available as POLY-SOLV ® EE from Olin Corporation or a diethylene glycol diethyl ether, such as the type available under the tradename Ansul E-141 from the Ansul Company of Marinette, Wis.

In operation, the gun assembly 14 is connected to the proportioning unit 11 via an appropriate coupling. The chemical supply assembly 12 is also connected to the proportioning unit 11 via the suction hoses 29 and 30. The compressed air supply line is turned on via an appropriate valve to supply compressed air to the system. An operator grips the handle 44 of the gun assembly 14 and squeezes the trigger 45 to cause the isocyanate component A chemical and the polyol component B chemical to flow through their chemical hoses 34 and 35 into the gun ball valve assembly 47 and then into the orifice plate adaptor 48, the orifice plate 49 and the discharge plate 50. The chemical components are mixed in the discharge plate 50 with the mix air that is provided through the air bleed and purge line 39 to initiate the exothermic chemical reaction that will result in the dispensing of polyurethane foam from the discharge nozzle 51.

After completion of the shot of desired duration, the operator releases the trigger 45 which actuates the time-delay relays within the electrical control box 22 to effect a two second delay before an approximately two second blast of purge air is sent through the air bleed and purge lines 39. This delay is sufficient time for the operator to move the gun assembly 14 away from the work area to avoid having the blast of air be directed into the freshly dispensed foam. The release of the trigger 45 permits the air cylinder (not shown) in the housing 42 of the gun assembly 14 to be returned to a predetermined position that permits the air signal line 40 to send a signal to the time-delayed relays within the control box 22 to automatically initiate the aforementioned purging air.

The operator then inserts the gun assembly 14 within the solvent bath assembly 15. The insertion of the discharge nozzle 51, the discharge plate 50, the orifice plate 49, and the orifice plate adaptor 48 within the dispensing assembly retainer 54, causes the arm 62 that is pivotally mounted to the arm housing 61 of the air switch 60 to be engaged and moved from its normally closed position to its normally opened position. This permits the air in the air infeed line 64 to pass through the air switch 60 and exit the air pilot sensor line 65. This burst of air is directed into the three-way pneumatic solenoid valve 66 in the electronic control box 22. The three-way pneumatic solenoid valve 66 is activated to cut off the flow of mix air through the air bleed and purge line 39 to the dispensing gun assembly 14 and simultaneously vent the residual air in the gun assembly 14 downstream of the valve 66. The discharge nozzle 51, the discharge plate 50, the orifice plate 49, and the orifice plate adaptor 48, are then immersed in the solvent 68 within the retainer 54 while the dispensing assembly retainer 54 serves as a holster for the gun assembly 14.

As the discharge nozzle 51, the discharge plate 50 and the orifice plate 49 rest in the solvent bath, any residual material within the gun assembly 14 is loosened by the chemical reaction with the solvent. When the operator requires another shot of polyurethane foam, he grips the gun assembly 14 by the handle 44 and removes it from the retainer 54. The removal of the gun assembly 14 permits the limit switch arm 62 to return to its normally closed position to stop the flow of air from the air infeed line 64 through the air switch 60. This automatically closes the three-way pneumatic automatic solenoid valve to stop the venting of the residual air and to reactivate the flow of air through the bleed and purge line 39. When the operator then engages the trigger 45 with the discharge nozzle 51 properly positioned over the target, the residual material loosened by the solvent bath is washed from the gun assembly with the flow of fresh chemicals and foam.

While the preferred structure in which the principles of the present invention have been incorporated as shown and described above, it is to be understood that the invention is not to be limited to the particular details thus presented, but in fact, widely different means may be employed in the practice of the broader aspects of this invention. The scope of the appended claims is intended to encompass all obvious changes in the details, materials, arrangement of parts, and method of operation, which will occur to one of skill in the art upon a reading of the disclosure. For example, any appropriate pressurized gas may be employed in place of the compressed air to perform the same vital tasks during the operation of the apparatus.

Having thus described the invention, what is claimed is:

1. Apparatus for dispensing plural component polyurethane foam and cleaning residue plural component polyurethane foam using a mixing gas to mix the plural components in a mixing chamber of a dispensing assembly and dispense them from the assembly and a purging gas for helping to remove residue components and foam, the combination comprising:
    (a) supply means to provide the plural components to the mixing chamber;
    (b) gas supply means to provide mixing gas at a predetermined pressure to the mixing chamber;
    (c) dispensing means connected to the mixing chamber and in fluid flow communication therewith;
    (d) means cooperable with the dispensing assembly for retaining the assembly at least partially immersed in a liquid solvent after the foam has been dispensed; and
    (e) means for actuating the gas supply means cooperable with the means for retaining the assembly so that upon insertion of the assembly into the means for retaining the assembly the gas supply to the assembly is stopped and the residual purging and mixing gas within the assembly is vented to permit the liquid solvent to travel up the dispensing means to the mixing chamber, the removal of the assembly from the means for retaining recommencing the gas supply.

2. The apparatus according to claim 1 wherein the means for actuating the gas supply means further comprises an air switch connected to a solenoid valve.

3. The apparatus according to claim 2 wherein the solenoid valve further vents mix air from the dispensing assembly upon insertion of the assembly into the means for retaining the dispensing assembly and upon removal of the assembly stops the venting.

4. The apparatus according to claim 3 wherein the dispensing assembly further comprises a hand held gun housing.

5. The apparatus according to claim 4 wherein the dispensing assembly further comprises an orifice plate connected to the gun housing.

6. The apparatus according to claim 5 wherein the dispensing assembly further comprises a discharge plate adjacent the orifice plate, the discharge plate further containing the mixing chamber.

7. The apparatus according to claim 6 wherein the dispensing means further comprises an elongate tubular discharge nozzle connected to the discharge plate.

8. The apparatus according to claim 2 wherein the means for retaining the dispensing assembly further comprises an open-topped generally cylindrical container with a continuous surface, the surface being cut away at predetermined locations to receive and hold the dispensing assembly.

* * * * *